(12) United States Patent
Boyle et al.

(10) Patent No.: US 9,010,278 B2
(45) Date of Patent: Apr. 21, 2015

(54) ANIMAL RUN LINE CORNERING MECHANISM

(76) Inventors: Paul E. Boyle, Wareham, MA (US); Steven Amarello, Plymouth, MA (US)

( * ) Notice: Subject to any disclaimer, the term of this patent is extended or adjusted under 35 U.S.C. 154(b) by 1116 days.

(21) Appl. No.: 12/493,651

(22) Filed: Jun. 29, 2009

(65) Prior Publication Data

US 2009/0260580 A1    Oct. 22, 2009

(51) Int. Cl.
*A01K 1/06* (2006.01)
*A01K 1/04* (2006.01)

(52) U.S. Cl.
CPC ........................................ *A01K 1/04* (2013.01)

(58) Field of Classification Search
USPC ................................................. 119/784, 785
IPC ......................................................... A01K 1/06
See application file for complete search history.

(56) References Cited

U.S. PATENT DOCUMENTS

| 1,563,212 | A |   | 11/1925 | Madiar |         |
|-----------|---|---|---------|--------|---------|
| 3,648,664 | A | * | 3/1972  | Nunley | 119/785 |
| 3,678,903 | A |   | 7/1972  | Ferraro |        |
| 3,983,845 | A | * | 10/1976 | Roehrig | 119/784 |
| 4,862,833 | A | * | 9/1989  | Brotz  | 119/785 |
| 5,979,599 | A | * | 11/1999 | Noles  | 182/36  |
| 6,886,498 | B1 |  | 5/2005  | Rochette |       |
| 2010/0018473 | A1 | * | 1/2010 | Brown | 119/784 |

* cited by examiner

*Primary Examiner* — Peter M Poon
*Assistant Examiner* — Thien Thanh Pham
(74) *Attorney, Agent, or Firm* — Altman & Martin; Steven K Martin

(57) ABSTRACT

An animal run line cornering mechanism with a corner component and leash component. The corner component is dumbbell shaped with a narrow body, a ball at one end with an aperture for the line, and a support attachment. The leash component has a tubular line ring with a shaped gap so that it appears C-shaped in end view, and leash ring attached to the line ring. The gap is wider than the corner component body and narrower than the line so that it is captured by the line. The line ring diameter is larger than the corner component ball and line diameters so that it moves freely along the line. The gap is defined by opposed edges of the line ring walls that taper to a rounded apexes. When the body hits the a tapered line ring wall, the body slides along the wall until it slides through the gap.

5 Claims, 2 Drawing Sheets

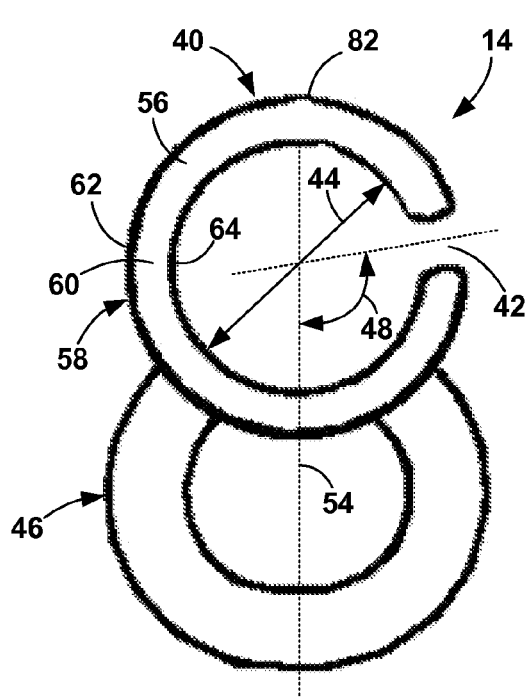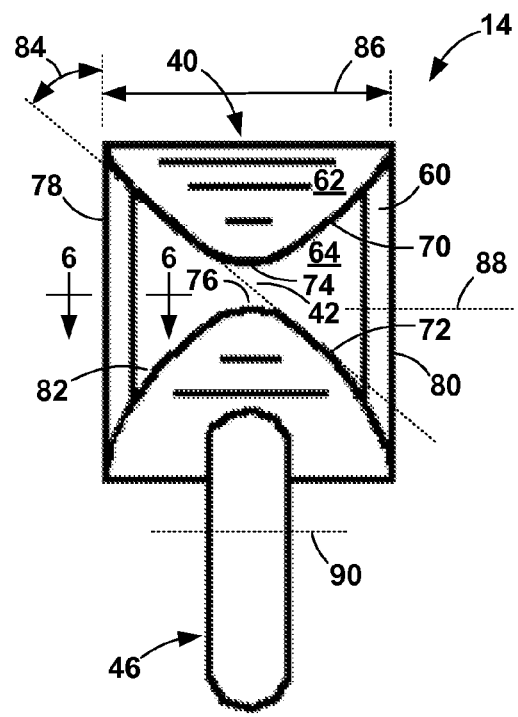
FIG. 3    FIG. 4
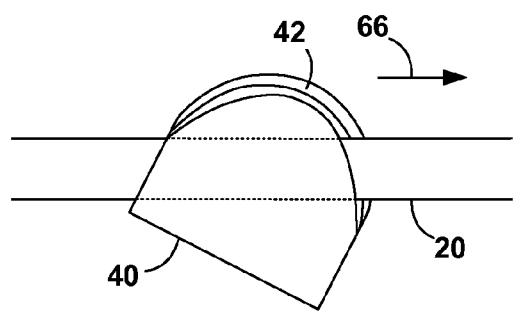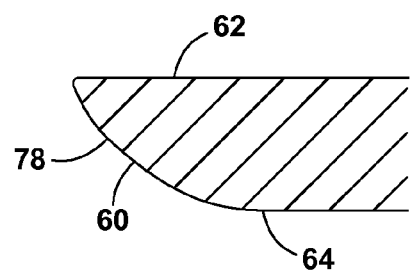
FIG. 5    FIG. 6

ANIMAL RUN LINE CORNERING MECHANISM

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to animal run lines, more particularly, to a cornering mechanism for an animal run line.

2. Description of the Related Art

The use of animal run lines is well-known. The typical system is comprised of a line strung between two stationary supports, such as a wall, tree, or post. A captured shuttle with the animal leash attached can freely move along the line. As the animal moves, the shuttle moves back and forth on the line, restricting the animal to an area immediately adjacent to the line. The lines are relatively short, typically a maximum of tens of feet, restricting the animal to a relatively small area.

The ability to include one or more corners in the line can greatly increase the area. The prior art includes several mechanisms for adding corners. For example, U.S. Pat. No. 1,563,212 discloses a device that allows a leashed animal to run along a cable in any angled arrangement. The line is supported by slotted eyelets. A shuttle to which the animal leash is attached is captured on the line. The shuttle fits through the eyelet with the leash attachment fitting through the slot. This design requires that the line remain taut and that the shuttle maintain a particular orientation on the line relative to the slot or the shuttle will not fit through the eyelet.

In another example, U.S. Pat. No. 6,886,498 discloses a complex cornering mechanism that uses a wheeled shuttle that appears limited to relatively wide corner angles. The moving parts means that the device may be undesirably affected by the weather.

In yet another example, U.S. Pat. No. 3,678,903 discloses an animal run cornering mechanism where the line support is cylindrical with a shaped slot. The shuttle has a small neck that slides through the slot. The shuttle has a small diameter, long tube through which the line extends, resulting in a large surface area that creates significant drag resistance. The assembly requires that the line support be mounted directly on a fixed wall or post, which may entangle the animal's tether, and/or restrict the animal's range of motion.

BRIEF SUMMARY OF THE INVENTION

An object of the present invention is to provide an animal run line cornering mechanism that is simple and effective.

Another object is to provide an animal run line cornering mechanism that is minimally impacted by the weather.

Another object is to provide an animal run line cornering mechanism that allows the animal to freely run past the corner without tugging or pulling the leash.

The animal run line cornering mechanism of the present invention has a corner component and a leash component. The corner component attaches the line to a stationary support. It is generally dumbbell shaped with a narrow, cylindrical body, a ball at one end, and a support attachment at the other end. The ball has a through aperture for the line. The support attachment can be adapted to any practical form of support, such as a wall, a post, or a cable extending from a wall or post.

The leash component has a tubular line ring with a shaped gap in the tube wall and leash ring attached to the line ring for attachment of the leash. The line ring appears C-shaped in end view. The gap is wider than the corner component body and narrower than the line so that the leash component is captured by the line. The line ring diameter is larger than the corner component ball diameter and, consequently, the line diameter, so that the leash component moves freely along the line.

The gap is defined by tapered opposed edges of the line ring wall. Each edge tapers from both line ring ends in a gentle curve to a rounded apex. The tapered sides guide the corner component body into the gap. When the body hits the line ring, the body slides along the edge until it reaches and slides through the gap.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 3 is a side view of the leash component of the cornering mechanism of FIG. 1;

FIG. 4 is a front view of the leash component of the cornering mechanism of FIG. 1;

FIG. 5 is a top, partial phantom view of an orientation of the leash component sliding on the line; and FIG. 6 is an enlarged, cross-sectional view of an edge of the leash component of FIG. 4 taken along the line 6-6.

DETAILED DESCRIPTION OF THE INVENTION

Figure 1:
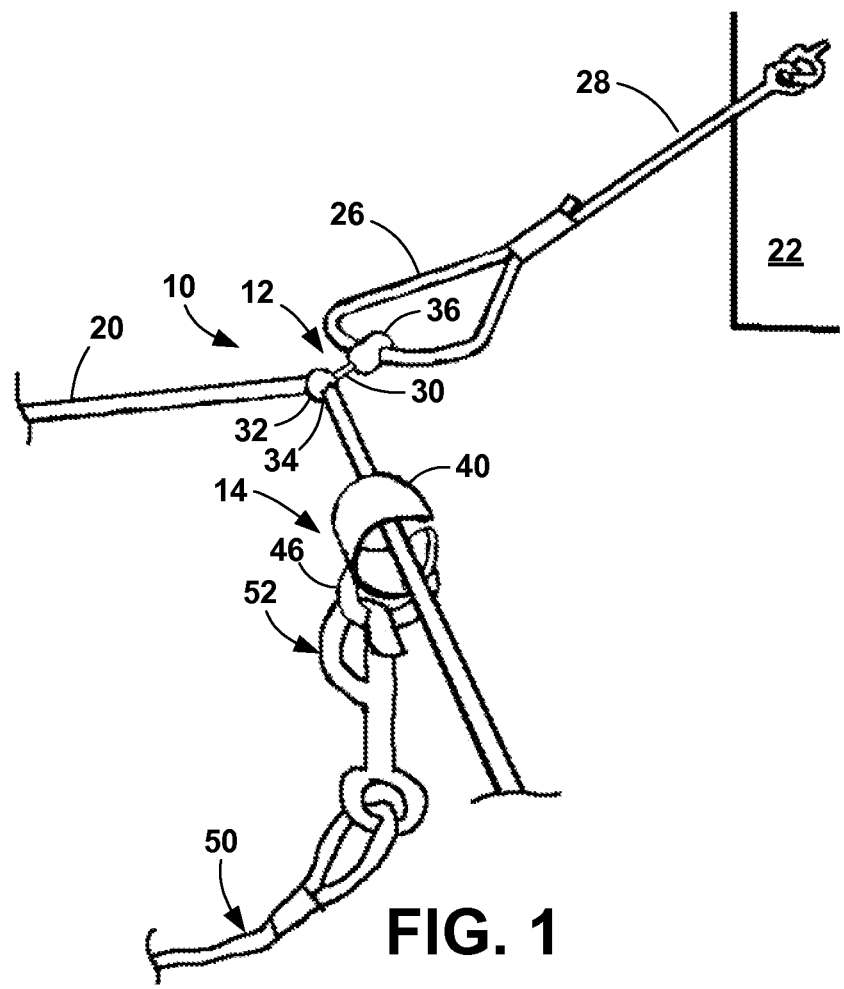
FIG. 1 is a perspective view of the cornering mechanism of the present invention installed on an animal run line.

The animal run line cornering mechanism 10 of the present invention, shown installed in FIG. 1, can be used to lengthen an animal run line by utilizing corners, thereby enlarging the area of an animal run. The corning mechanism 10 has two components, a corner component 12 and a leash component 14.

The present specification describes dimensions for the current configuration of the cornering mechanism 10. These dimensions are in no way intended to limit the invention to the disclosed dimensions, but merely illustrates one possible set of parameters.

Figure 2:
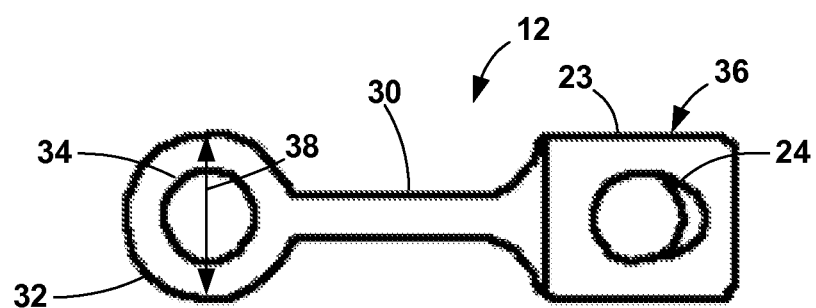
FIG. 2 is a side view of the corner component of the cornering mechanism of FIG. 1.

As shown in FIG. 1, the corner component 12 attaches the line 20 to a stationary support 22, such as a wall, tree, or post (referred to as a "support" in the remainder of the specification and claims). As shown in FIG. 2, the corner component 12 is generally dumbbell shaped, with a cylindrical body 30 having a round cross section. At one end is a ball 32 and at the other end is a support attachment 36. The diameter of the body 30 and the diameter of the ball 32 depend on the parameters of the leash component 14 as described below.

The ball 32 has an aperture 34 through which the line 20 extends. Preferably, the aperture 34 is perpendicular to the body 30, although small deviations from perpendicular are also contemplated. In one configuration, the aperture 34 is larger in diameter than the line 20 so that corner component 12 easily moves on the line 20. This allows the corner component 12 to be easily removed from the line 20 or the position of the corner component 12 on the line 20 to be changed easily. Alternatively, the aperture 34 is sized to snuggly secure the line 20 so that the corner component 12 cannot move along the line 20. This configuration may be desirable where the animal run line is a permanent fixture.

The support attachment 36 can be adapted to any practical form of support. FIGS. 1 and 2 show the support attachment 36 as an enlarged block 23 with a through aperture 24 that can receive a loop 28 from a line 26 that is attached to the support 22.

The leash component 14 of the present invention is shown in detail in FIGS. 3 and 4. The main element of the component is a tubular line ring 40 with a shaped gap 42 in the tube wall 82 such that the line ring 40 is C-shaped in end view, as in FIG. 3. The gap 42 is wider than the diameter of the corner component body 30 and narrower than the diameter of the line 20 so that, when the line ring 40 is on the line, as in FIG. 1, the leash component 14 remains captured by the line 20. In the present configuration, the gap 42 has a width of 0.127 inch while the corner component body 30 has a diameter of 0.1 inch. The diameter 44 of the line ring 40 is substantially larger than the diameter 38 of the corner component ball 32, making it also substantially larger than the diameter of the line 20, so that the leash component 14 moves freely along the line 20. In the present configuration, the line ring 40 has a diameter of 0.639 inch while the corner component ball 32 has a diameter of 0.375 inch.

Opposed edges 70, 72 of the line ring wall 82 taper to produce the gap 42, as shown in FIG. 4. The walls 70, 72 are mirror images of each other. Each edge 70, 72 tapers from both ends 78, 80 of the line ring 40 in a gentle curve to a rounded apex 74, 76. The space separating the two apexes 74, 76 forms the gap 42. The slope of the curve depends, in part, on the length 86 and diameter 44 of the line ring 40 and the desired width of the gap 42. In the present configuration, the line ring 40 has a length of 0.75 inch and the walls 70, 72 taper at an angle 84 of approximately 50° from the end 78 of the line ring 40 to form a gap 42 with a width of 0.127 inch.

The tapered sides 70, 72 guide the corner component body 30 into the gap 42 regardless of the angle at which the body 30 hits the line ring 40. When the body 30 hits the line ring 40 at an edge of one of the sides 70, 72, the body 30 slides along the edge until it reaches and slides through the gap 42. While the gap 42 is aligning with the body 30, the line ring 40 rotates about the line 20.

A leash ring 46 is attached to the line ring 40. Preferably, the leash ring 46 is an approximately ¾ circular or oval ring that is attached such that the line ring axis 88 and leash ring axis 90 are generally parallel, as in FIGS. 3 and 4. The leash ring 46 facilitates attachment of the leash 50, which will typically be by a leash clip 52, as in FIG. 1. As line ring 40 rotates to align with the corner component body 30, the clip 52 slides along the leash ring 46 so as not to pull the leash 50.

The angle 48 between the gap 42 and the center 54 of the leash ring 46 is a bit larger than 90 degrees. As the animal runs, the leash will be pulling the leash component 14 to the side, not straight down. The angle 48 will make it more likely that the gap 42 to be in near alignment with the corner component body 30. In the present implementation, the angle 48 is approximately 100 degrees. The present invention, however, contemplates that the gap 42 can be at any angle 48 to the leash ring 46.

As the leash component 14 is pulled along the line 20, the line ring 40 tends to rotate on a generally vertical axis such that the gap 42 is toward the direction of travel 66, as in FIG. 5. This enables the gap 42 to more easily align with the corner component body 30.

FIG. 6 is an enlarged view showing the rounded profile of one end 78 of at least half the circumference 58 of the line ring 40 opposite the gap 42. The end 78 curves inwardly, as at 60, from the outer surface 62 to the inner surface 64. The other end 80 has a mirror image profile. As the line ring 40 moves along the line 20, it may tilt. The end shape illustrated in FIG. 6 facilitates movement of the line ring 40 on the line 20 by eliminating sharp edges where the line 20 may touch.

The leash component 14 is composed of a strong, rigid material that exhibits minimal wear. Preferred materials are metals, such as aluminum alloys and iron alloys. The present invention contemplates that other strong, rigid, wear-resistant materials can be used. The leash component 14 can be cast, molded, machined, or formed in any manner consistent with the material.

The corner component 12 is composed of a strong material that exhibits minimal wear. The corner component 12 may be rigid or flexible, depending on the application. Contemplated rigid material are the same as those for the leash component 14. Contemplated flexible materials include strong metal wires.

Thus it has been shown and described an animal run line cornering mechanism which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:
1. An animal run line cornering mechanism comprising:
   (a) a corner component including a cylindrical body with a diameter and two opposed ends, a ball with a diameter at one of said opposed ends, and a support attachment at the other of said opposed ends, said ball including a through hole adapted to receive a line; and
   (b) a leash attachment having a tubular line ring with ends, a wall, and a diameter larger than said diameter of said ball, a leash ring attached to said wall, opposed edges of said wall curving inwardly to opposed apexes to form a gap defined by said opposed apexes, said gap being wider than said diameter of said cylindrical body and adapted to be narrower than said line;
   (c) whereby, when said tubular line ring is captured on said line, said support attachment is attached to a stationary support, and said leash attachment moves along said line to the corner component, said wall strikes said cylindrical body and guides said cylindrical body through said gap.

2. The animal run line cornering mechanism of claim 1 wherein said corner component is composed of a rigid material.

3. The animal run line cornering mechanism of claim 1 wherein said cylindrical body is composed of a flexible material.

4. The animal run line cornering mechanism of claim 1 wherein said support attachment is a block with a through aperture.

5. The animal run line cornering mechanism of claim 1 wherein said ends of said tubular line ring are rounded.

\* \* \* \* \*